Patented Nov. 21, 1950

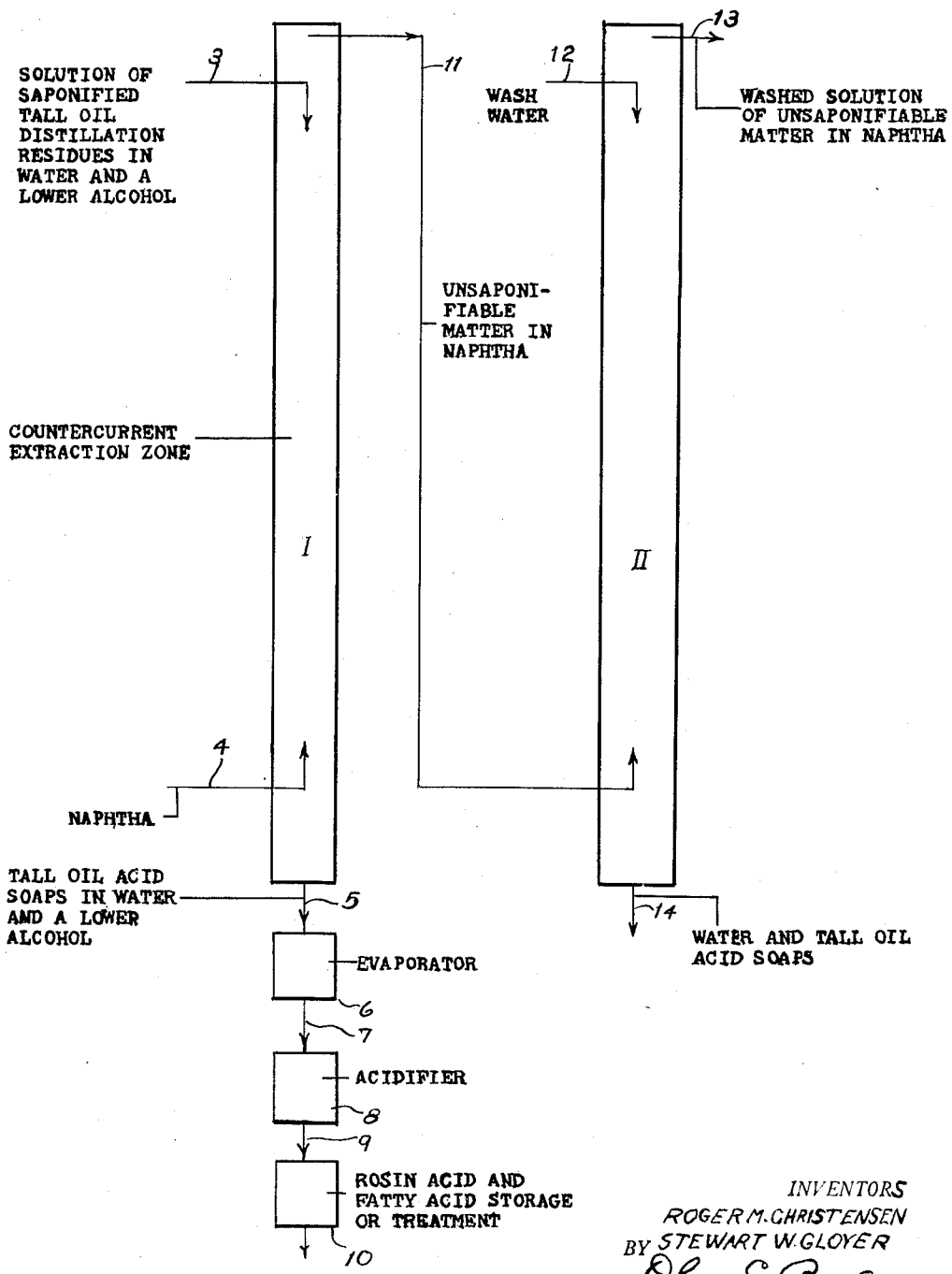

2,530,810

UNITED STATES PATENT OFFICE 2,530,810

SEPARATION OF UNSAPONIFIABLE MATTER FROM TALL OIL RESIDUE

Roger M. Christenson and Stewart W. Gloyer, Milwaukee, Wis., assignors to Pittsburgh Plate Glass Company Application August 23, 1949, Serial No. 111,882

9 Claims. (Cl. 260—97.7)

The present invention relates to a process of obtaining the unsaponifiable matter, such as sterols and the like, from carboxylic acids in a relatively pure state, and it has particular relation to a process of obtaining the unsaponifiable matter of tall oil.

One object of the invention is to provide a process of obtaining sterols of tall oil in which the distillation residues or pitches left from the distillation of tall oil to obtain the rosin acids and fatty acids thereof in a commercially usable condition are employed as the raw material.

A second object of the invention is to provide a process of recovering unsaponifiable matter comprising sterols from the crude distillation residues or pitches from the distillation of tall oil acids by application of which relatively pure and highly valuable sterols, such as sitosterol and the like, are obtained in a condition suitable for the synthesis of sex hormones and other valuable products.

A third object of the invention is to provide a process of recovering unsaponifiable matter of tall oil which operates smoothly without emulsification difficulties, and which is susceptible of continuous counter-current operation on commercial scales.

A fourth object of the invention is to provide a process by application of which an optimum amount of sterols can be obtained by treatment of a minimum amount of material.

A fifth object of the invention is to provide a process of separating the sterols and other unsaponifiable matter of tall oil from tall oil distillation residues in which an acid residue is obtained in a state admitting of ready recovery of an additional portion of rosin acids and fatty acids.

A sixth object of the invention is to provide a process of recovering the unsaponifiable matter of tall oil present in distillation residues in which the solution of recovered unsaponifiable matter can readily be washed with water to remove residual soaps.

These and other objects will be apparent from consideration of the following specification and the appended drawings.

In the drawing, the single figure illustrates the invention diagrammatically.

In the manufacture of paper pulps by certain chemical processes, notably the sulfate process, there are obtained crude mixtures comprising soaps of fatty acids, soaps of rosin acids, unsaponifiable matter, coloring matter, and odor-producing components. The mixture may be acidified to regenerate the rosin acids and fatty acids and is then known as tall oil. This mixture in its initial form is so crude and impure as to be of but little importance, although it has been recognized that at least some components of the tall oil are, of themselves, of considerable value for various purposes. Particular attention has been given to the rosin acid soaps and the fatty acid soaps as sources of the free acids. The free acids have been obtained in partially refined state by acidification of the tall oil soaps and subsequent distillation of a portion of the acid constituents, thereby leaving a still residue or pitch of greater impurity than the original tall oil. In this manner, it was possible to obtain rosin acids and fatty acids having some value for commercial purposes. Even the distilled acids were handicapped in their commercial application by the presence of considerable unsaponifiable matter.

The present invention contemplates the provision of a process whereby the highly impure distillation pitches obtained after the partial removal of the free rosin and fatty acids of tall oil in conventional refining operation can be treated in a simple and economical manner to obtain the unsaponifiable matter of tall oil in a concentrate susceptible of further treatment to obtain sitosterol and such like sterol constituents in a form admitting of their fractionation and use in the synthesis of various pharmaceuticals, such as sex hormones and the like, and the acids are recovered in a state admitting of their use in paints and varnishes and other applications.

The invention involves: (a) the saponification of the saponifiable matter such as rosin acids and the free fatty acids of the distillation pitches of tall oil; (b) solution of the resultant soaps and the other constituents of the pitches in an aqueous alcohol; (c) extraction of the solution with a solvent, such as naphtha, chlorinated hydrocarbons, ethers and the like, to obtain a fraction highly enriched in unsaponifiable matter of the tall oil and correspondingly impoverished in acid constituents in a counter-current fashion; (d) washing the extract solution with water to remove residual soaps in a counter-current fashion; (e) evaporating the solvent from the extract solution; (f) refining the sterols, and (g) recovering and refining the acids.

In the practice of the invention, tall oil distillation pitches of the following composition may be employed:

| | Per cent |
|---|---|
| Fatty acids | 20 to 50 |
| Rosin acids | 20 to 50 |
| Unsaponifiable matter | 10 to 30 |

Such a pitch from tall oil distillation is sold by the West Virginia Paper and Pulp Company under the trade name of "Tallene."

The distillation pitch may be saponified with an alkali, preferably sodium hydroxide or potassium hydroxide in an aqueous alcohol solution. In this solution the proportion of alkali preferably is sufficiently high approximately to saponify all of the rosin acids and free fatty acids present. Of course, excesses (e. g. 10 to 100%) of alkali may be employed but usually a great excess is undesirable since it is uneconomical.

The solvents for the soaps may comprise water in admixture with various of the lower alcohols in appropriate ratio. For example, the alcohol component may comprise methyl alcohol, ethyl alcohol, propyl alcohol, isopropyl alcohol, butyl alcohol or isobutyl alcohol. Isopropyl alcohol is usually preferred.

The alcohols contemplated are water soluble, monohydric and contain 1 to 4 carbon atoms in an aliphatic hydrocarbon group. Of these alcohols, isopropyl alcohol is substantially superior to the others especially at moderate temperatures, e. g. within a range of 80 to 140° F. or thereabout.

At temperatures of about 160° F. and up to a temperature at which the vapor pressure of the mixture becomes excessive all of the above designated alcohols will operate successfully as the alcohol component of the soap system.

The following represents a typical saponification batch which after dilution with proper amounts of water and alcohol is suitable for countercurrent extraction to separate the unsaponifiable matter in accordance with the provisions of the present invention:

Example A 200 parts distillation pitch
90 parts isopropyl alcohol
24.4 parts sodium hydroxide
85.6 parts of water The parts as expressed in the composition are by weight.

A mixture of the above composition was appropriately heated under a reflux condenser, for example to the temperature of boiling until the saponifiable constituents had been reacted with the sodium hydroxide. (The ratio of alcohol and water can vary considerably in the saponification.) Higher temperatures could be employed, but a pressure container would then be required. Lower temperatures may also be employed but the reaction will be slower. Refluxing may be continued for 1 or 2 hours or much longer if desired. However, prolonged heating is less desirable since it increases costs.

Soaps of tall oil pitches can be made up in solutions of varying concentration of the soaps in a water-alcohol mixture of varied alcohol concentration. These solutions can be extracted with various solvents of the unsaponifiable matter which solvents may vary in proportion over a relatively broad range of proportions. Also the temperature of extraction is susceptible of considerable variation. For example, the soaps may be employed in a concentration of 5 to 35% by weight based upon the total solution of soaps but the preferred concentration is about 15 to 20%, e. g. 18.5%. The final percentage of the alcohol in the alcohol-water mixture is within a range of 7 to 50% and preferably is within a range of 15 to 36%. In most instances, the solvent employed to extract the unsaponifiable matter from the alcohol-water solution will be in a ratio at least as high as 1:1 with respect to the soap solution and in many instances it may be much higher. It may, for example be employed within a range of 15 or 20 to 1, though of course the higher ratios tend to be uneconomical because of the volumes of solvents which must be handled and distilled.

The temperature at which extraction of the unsaponifiable matter is effected may be within the approximate range of 75 to 145° F. but optimum temperature is about 115 to 135° F., e. g. 120° F. for isopropyl alcohol solutions. For other alcohols, higher temperatures, e. g. 160 or 170° F. are preferred.

It will be apparent that in a system involving so many variables it is impossible to establish rules applicable in all cases for the determination of the desired factors and conditions to obtain optimum results. However, the following are some points which may be considered in arriving at a satisfactory system. The prime factor in a soap-solvent for unsaponifiable matter system is to obtain smooth performance without emulsions which would make the counter-current system inoperable. The system should be operated for purposes of economy with the minimum amount of solvent for unsaponifiable matter, e. g., naphtha, capable of extracting all the unsaponifiable matter. If the alcohol concentration is high, an excess of naphtha will be required for complete extraction. If the soap solution is excessively concentrated, an undue amount of solvent for unsaponifiable matter will be dissolved before the solvent-unsaponifiable matter solution begins to separate. Where an excess of solvent for unsaponifiable matter is thus taken into solution difficulty may be encountered in obtaining complete extraction of the unsaponifiable matter. It is thus apparent that it is desirable to keep the alcohol concentration as low as possible and at the same time it is desirable to obtain a reasonable concentration of soap. It is also desirable that a minimum of soap of the tall oil residue be carried over into the solution of unsaponifiable matter, otherwise the process of washing out the soap will be complicated.

In typical examples soaps of tall oil pitches made up in the manner above described in Example A were dissolved in isopropyl alcohol and water and were then extracted by shaking with naphtha of approximately heptane grade in a batchwise operation. Extractions were performed at room temperature or about 80° F. and at 120° F., the latter being near the optimum operating temperature. The ratio of soap solution to naphtha was approximately 1 to 1 in parts by volume.

Example I

In this example the saponified pitch was employed in a 5% concentration in alcohol and water. Percentages of isopropyl alcohol in the solution within a range of 19.5 to approximately 50% was found to produce good separations of the naphtha phase within a period of 1 to 5 minutes.

Example II

In this example the soap was made up into a water-alcohol solution containing 10% of the saponified tall oil pitch. Good separations were obtained with an isopropyl alcohol content within a range of 9.1 to 46.9% of the mixture to be extracted. In Examples I and II the lower concentrations of alcohol tended to be less effective at room temperatures.

Example III

In this example a saponified pitch solution of 14% concentration was made up with isopropyl alcohol and water so that the resultant solution had an alcohol content within a range of about 9.2 to 47%. Good separations were obtained by naphtha extraction especially within the 120° F. range.

Example IV

In this example the soaps of the saponified tall oil pitches were made up to a concentration of 18.5% in a mixture of isopropyl alcohol and water. The alcohol in this case was employed over a range varying from 7.9% to 49% and good separations from the naphtha phase were effected over the entire range especially at the temperature of 120° F. This concentration of soap solution apparently is near the optimum. The best concentration of alcohol with such a solution of soap is approximately 15 to 36%.

Example V

The soap concentration in this example was 21%. Isopropyl alcohol in water constituted the solvent for the saponified tall oil residue. The isopropyl alcohol was employed in a percentage ratio within the range of 9 to 46.

Example VI

The solutions in this example contained 25% of saponified tall oil pitches and the alcohol-water-soap solution contained 10.7 to 39.1% of isopropyl alcohol. The naphtha phase readily separated from the alcohol-water phase.

Example VII

The water-isopropyl alcohol solution in this case contained 25% of saponified tall oil pitch. Good separations of the unsaponifiable matter in naphtha were obtained with an alcohol percentage of 12.9 to 35% in the soap solution.

Example VIII

In this example a soap concentration of 35% was employed. Good separation of unsaponifiable matter was obtained at a temperature of 120° F. and with an alcohol concentration of 19.8%.

Example IX

In this example the saponified tall oil residue prepared as above described in Example A was further diluted with an additional 590 parts by weight of water and 90 parts by weight of isopropyl alcohol. In this example, the ratio of water to alcohol is approximately 3.75% to 1. Ratios between 3 and 4 to 1 are preferred. The solution was found to be excellently adapted for extraction with solvents for the unsaponifiable matter in order to obtain the latter in highly concentrated form. No difficulty from emulsification was encountered.

Various solvents for unsaponifiable matter which are immiscible with or but partially miscible with soap solutions may be employed to extract the preceding solution. These include naphtha such as a heptane fraction or a fraction of higher or lower molecular weight petroleum hydrocarbon. Other solvents of unsaponifiable matter of tall oil which may be employed in the extracting operation. Solvents which are relatively immiscible with the water-alcohol-soap solutions comprise ethers such as diethyl ether, mixed ethyl propyl ether, aromatic hydrocarbons such as benzene, xylene or toluene, chlorinated hydrocarbons such as ethylene dichloride and other solvents for sterols and other unsaponifiable constituents, which solvents are immiscible or but partially miscible in the water-soap-alcohol solutions.

The separation of the unsaponifiable matter from the aqueous alcohol soap solutions by use of an immiscible solvent such as naphtha may be conducted batchwise, if so desired, but by application of our invention we find it possible and preferable to effect the extraction in a continuous operation in a suitable column in which the soap solutions are caused to flow countercurrently with respect to the solvent of the unsaponifiable matter. The application of counter-current extraction is a highly important feature of the present invention. A suitable embodiment of apparatus for use in the counter-current extraction is diagrammatically illustrated in the single figure of drawings.

The apparatus comprises columns I and II. A soap solution of tall oil distillate comprising saponified rosin acids, saponified fatty acids and the unsaponifiable matter in solution, in aqueous alcohol may be fed into column I near the top thereof as indicated at 3 and a relatively immiscible solvent for the unsaponifiable matter, e. g. naphtha, is fed in near the bottom as indicated at 4. If a solvent of greater density than the soap solutions is employed, the positions of connections 3 and 4 will be reversed. The aqueous alcohol solution of soaps from which most of the unsaponifiable matter has been extracted by the immiscible solvent is drawn off from the bottom of the column as indicated at 5 and passes to a still 6 for removal of the solvents contained therein. The soaps from which the solvents have been evaporated and returned to the system pass through a line 7 to a container 8 where they are acidified in order to regenerate the free acids such as rosin acids and fatty acids. The acids thus recovered pass out through a line 9 to a container 10 for storage or for further treatment.

The solution of unsaponifiable matter in naphtha or other appropriate solvent immiscible with aqueous alcohol-soap solutions is drawn off at the top of column I through line 11 and passes to a zone slightly above the bottom of column II. Simultaneously water is fed into the top of column II as indicated at 12 in order to wash out residual soaps from the concentrate of unsaponifiable matter. The naphtha solution of the unsaponifiable matter is drawn off through line 13 at the top of column II. Simultaneously, the water solution of soaps and other water soluble constituents is drawn off as indicated at 14 and may be subjected to further treatment. The naphtha solution of unsaponifiable matter containing a high percentage of sterols may be subjected to further treatment. For example, it may be subjected to evaporation in order to eliminate the naphtha. If desired, the sterols can be crystallized out from methyl alcohol, acetone or other appropriate solvent and are obtained in a state of comparative purity. Countercurrent extraction is illustrated by the following example:

Example X

In this example, a soap solution from tall oil pitch made as above described in Example A was diluted to a concentration of 18.5% of pitch as soap in a mixture of water and isopropyl alcohol with the final concentration of alcohol being 16.7%. This solution was fed through line 3 into the top portion of the column I in a ratio of 95 parts by volume while naphtha was fed in near the bottom through line 4 in a ratio of 190 parts by volume. The column was maintained at a temperature within a range of 120 to 130° F. This temperature is susceptible of substantial variation above and below this range. The naphtha extract passing out at the top of the column was subsequently washed with water in a column II in a ratio of 380 parts by volume. The ratio of water with respect to naphtha feed in column I was 2 to 1 but may be higher or lower dependent upon the thoroughness of washing required and the economics of operation. The washing column was maintained at a temperature of 115 to 125° F. The temperature again may be varied up or down.

Solutions of tall oil pitch soaps made up as described in Examples I to IX may be employed in similar manner, for counter-current extraction in the apparatus shown, though with some variation in the degree of success and economy.

The washed naphtha extract as thus obtained was distilled in order to remove the naphtha whereby to obtain a fraction of unsaponifiable matter which was extremely rich in sterols. The size of this fraction, of course, will vary dependent upon the concentration of unsaponifiable matter in the original distillation pitch which is treated. Usually this fraction will constitute about 23 to 25 per cent of the original distillation pitch. It will comprise about 90 to 97 per cent of the total unsaponifiable matter of the soap solution.

This unsaponifiable matter can be further fractionated in order economically to obtain sterols of high purity by various methods such as crystallization or by extraction with a solvent such as furfural. In the crystallization method of purification, methanol or other lower alcohol, acetone or other solvent of sterols may be employed as a solvent. In a specific example methanol was employed in a ratio of approximately 12 liters per 750 grams of crude unsaponifiable matter. A yield of 395 grams comprising 77 per cent sterol was obtained. This fraction of sterols comprised 52.7 per cent of the unsaponifiable matter and had a melting point of 119 to 121° C. Of course, the ratio of methanol to crude unsaponifiable matter in solution is susceptible of wide variation and in effect varies continuously as more and more unsaponifiable matter crystallizes out.

Needless to say, the soaps of rosin acids and free fatty acids from which the unsaponifiable matter is extracted and most of the alcohol and naphtha removed by evaporation, can be treated in order to recover the rosin acids and fatty acids. Such methods of recovery include acidification to regenerate the free acids followed by distillation of the acids. The acids can also be recovered and fractionated by other methods, for example, by esterifying the fatty acids with the lower alcohol and then distilling off the esters or by extracting them by means of a suitable solvent.

In a specific example, some of the water-alcohol solutions of soaps from column I were subjected to distillation to evaporate most of the alcohol. The soaps were then acidified with an acid. In such operation the acid may be sulfuric, hydrochloric, or any other acid capable of splitting alkali from the carboxylic acid salts. Usually a slight excess of acid is employed but a great excess is permissible, though uneconomical.

The acidified material was water washed and then distilled under vacuum. A yield of 47.2 per cent of light yellow acids, acid value 185.9, iodine value 177.8 and containing 46.7 per cent rosin acids was obtained. The free fatty and rosin acids are quite similar to the corresponding acids recoverable by distillation of whole tall oil except for the fact that the unsaponifiable matter has been removed thus enhancing their value for use in paints and varnishes.

In the foregoing examples, isopropyl alcohol was employed as the alcohol component of the solution of soaps of tall oil acids to be extracted with naphtha. As previously intimated, it is exceptionally meritorious since the solution of alkali treated tall oil distillation residues in a mixture of water and this alcohol and separates very quickly and sharply from naphtha when intimately commingled therewith. This is outstandingly true at moderate temperatures. At temperatures of about 120° F. and up, solutions of the soaps and unsaponifiable material from tall oil pitches will break sharply and cleanly from naphtha in three minutes or even less. This is highly important for good countercurrent operation. It would appear that the phases when shaken together thoroughly in small quantities, e. g. liter quantitites or less, should separate cleanly in not more than 5 or 6 minutes. This provides a convenient test for the operability of the system with some of the alcohols, separation at ordinary temperatures or slightly above is inordinately slow or is so indefinite as to preclude the alcohols. Some of the alcohols which are impracticable for use in counter-current operations at low or moderate temperatures become fairly effective at high temperatures, e. g. about 160° F. This fact was demonstrated by the following tests. In the tests, tall oil distillation residue or pitch was the material to be treated. Batches were made up with the several alcohols herein disclosed as follows:

*Example B*

| | Parts by weight |
|---|---|
| Pitch | 100 |
| NaOH | 12.2 |
| Aliphatic alcohol | 45. |
| Water | 42.8 |

The mixtures were refluxed until the acids had been converted to soaps, e. g. for 4 hours.

The solutions of soaps and unsaponifiable matter were then cooled and diluted to desired concentrations with additional water and aliphatic alcohol. This may be accomplished by adding to the foregoing batches:

| | Parts by weight |
|---|---|
| Water | 45.4 |
| Aliphatic alcohol | 297 |

The final compositions were:

| | Parts by weight |
|---|---|
| Pitch as soaps | 18.5 |
| Aliphatic alcohol | 16.7 |
| Water | 62.6 |
| NaOH (free and combined) | 2.2 |

A portion of each batch was shaken with naphtha of heptane to octane range at temperatures of 120° F. and 160° F. with the following results:

| Alcohol | Settling Behavior | |
|---|---|---|
| | 120° F. | 160° F. |
| Methanol | Slow separation ¼" layer at interface. | Fairly good—complete in 5 minutes to sharp interface. |
| Ethanol | ¼" layer of flocculent material at interface. | Fairly good—complete in 5 minutes to sharp interface. |
| n-propanol | good but slow—9 minutes required for complete separation. | Do. |
| Isopropanol | excellent separation in 3 minutes. | excellent separation in 2 minutes. |
| n-butanol | settled quite slowly, but had a sharp interface. | fairly good—complete in 5 minutes to sharp interface. |
| Isobutanol | do | Do. |

At 120° F. isopropanol solutions separated quickly and cleanly from the naphtha. It likewise separated even more readily at 160° F. At 120° F. the solutions of the other alcohols separated slowly. Countercurrent operations would be impractical at this temperature range or at least would be severely handicapped. At 160° F. solutions containing methanol, ethanol n-propanol, n-butanol or isobutanol separated much more readily, indicating that at elevated temperatures the systems containing these alcohols would be operative for extraction with a naphtha, using countercurrent technique.

Example XI

Make up a solution with methanol in accordance with Example B. Counter-currently extract the solution with 1 to 20 volumes of naphtha of hexane to octane range at 150-160° F. in the apparatus shown in the drawing. The unsaponifiable matter will be taken off in the naphtha phase at 11 and may be washed with water in column II and then may be recovered and processed as desired.

The soaps of fatty acids and rosin acids may be drawn off in the methanol-water phase at 5 and appropriately processed in the subsequent stages 6, 7, 8, 9, 10.

Example XII

Substitute ethanol for methanol in Example XI and proceed in the same manner.

Example XIII

Substitute normal propanol for methanol in Example XI. Effect extraction with naphtha at a temperature in a range of 160 to 180° F. or thereabouts.

Example XIV

Substitute n-butanol for methanol in Example XI and countercurrently extract the soap solutions with naphtha at a temperature below the boiling point of the alcohol and preferably 160° F.

Example XV

Substitute isobutanol for methanol in Example XI and extract the unsaponifiable matter of the soap solutions with naphtha at a temperature below the boiling point of the isobutanol-water mixture and preferably about 160° F.

It is contemplated to vary the solids content of the alcohol-water mixture in the foregoing examples within a range of 5 to 40% upon a weight basis. The alcohol is preferred in a range of 7 to 50% by weight of the water-alcohol mixture.

The separation of the alcohol-water phase containing the soaps from the naphtha phase containing unsaponifiable matter is a function of the temperature. The correct temperature for a given system is easily arrived at by agitating together or otherwise thoroughly commingling a soap solution and naphtha, e. g. a paraffinic naphtha and raising the temperature until good separation can be attained in 5 or 6 minutes or less. Particular emphasis has been placed upon an extraction temperature of about 160° F. Some alcohols, notably isopropyl alcohol, operate well at considerably lower temperatures.

It is contemplated to operate at considerably higher temperatures so long as the vapor pressure in the system does not become excessive. Temperatures of 180 or even 200° F. would seem feasible for propanol or the butyl alcohols. Operations may be conducted at temperatures above the atmospheric boiling points of the solvents employed by applying pressures greater than atmospheric to the extraction zone.

In the examples, particular reference has been made to vertical columns as means for effecting continuous counter-current contact of the water-aliphatic alcohol solution of saponified pitches of tall oil and naphtha. However, it is also contemplated to employ other modes of effecting such contact through application of differences in density of the liquids. Continuous counter-current contact may also be effected between the liquid phases by application of a centrifuge of the type shown in U. S. patents: 2,286,157; 2,281,796; 1,936,523; 2,209,577; 2,109,375.

In these embodiments of apparatus, the soap solutions would be introduced at the axis of the centrifuge and the naphtha would be introduced at the outer periphery. The solutions would permeate through each other as they follow the turns of the involute diaphragm. The naphtha solution of unsaponifiables would be taken off at the axis and treated to recover the unsaponifiable matter, for example, by washing and/or by evaporation of the naphtha.

The embodiments of the invention herein described are by way of example only. It will be apparent to those skilled in the art that numerous modifications may be made therein without departing from the spirit of the invention or the scope of the appended claims.

This application is a continuation-in-part of our co-pending application, Serial No. 701,900, filed October 8, 1946, now abandoned.

We claim:

1. A method of obtaining the unsaponifiable matter of tall oil, which method comprises saponifying with alkali a distillation residue of tall oil comprising 20 to 50% fatty acids, 20 to 50% rosin acids and 10 to 30% unsaponifiable matter, dissolving the resultant saponified mixture in water and isopropyl alcohol to give a final concentration of 7 to 50% isopropyl alcohol, then counter-currently extracting the unsaponifiable matter from the solution with naphtha and evaporating off the naphtha from the unsaponifiable matter.

2. A method of obtaining the sterols and other unsaponifiable constituents of tall oil, which method comprises saponifying a distillation residue of tall oil containing 20 to 50% fatty acids, 20 to 50% rosin acids and 10 to 30% unsaponifiable matter, making up the resultant mixture of rosin acid soaps, fatty acid soaps and unsaponifiable matter as a solution of about 18.5% of the saponified pitch in water and isopropyl alcohol with the final solution containing about 15 to 36% isopropyl alcohol, counter-currently extracting the resultant solution with naphtha at a temperature of about 120° F. to remove the unsaponifiable matter in the solution, then washing the resultant solution of unsaponifiable matter in naphtha with water to remove residual soaps and other water-soluble constituents.

3. A method of obtaining the sterols and other unsaponifiable constituents of tall oil, which method comprises distilling off a concentrate of rosin acids and fatty acids from tall oil to obtain as a distillation residue, a concentrate of unsaponifiable matter of tall oil containing 20 to 50% fatty acids, 20 to 50% rosin acids and 10 to 30% unsaponifiable matter, treating the distillation residue with sodium hydroxide to saponify the rosin acids and fatty acids making up the mixture of soaps and unsaponifiable matter to a concentration of about 18.5% of the mixture in water and isopropyl alcohol with a final concentration of about 15 to 36% isopropyl alcohol in the solution, counter-currently extracting the unsaponifiable matter from the resultant solution with naphtha of heptane grade, then extracting the resultant solution of unsaponifiable matter in naphtha with water in order to remove residual soaps.

4. A method of obtaining the sterols and other unsaponifiable matter of tall oil, which method comprises saponifying a distillation residue of tall oil containing 20 to 50% of fatty acids, 20 to 50% of rosin acids and 10 to 30% of unsaponifiable matter, making up the resultant mixture of rosin acid soaps, fatty acid soaps and unsaponifiable matter as a solution of about 5 to 35% of saponified distillation residue in water and isopropyl alcohol, the final solution containing 15 to 36% of isopropyl alcohol, counter-currently extracting the resultant solution with naphtha to remove the unsaponifiable matter, then extracting out residual soaps in the naphtha solution with water.

5. A method of obtaining the rosin and fatty acids of tall oil in relatively pure state from a distillation residue of tall oil, which method comprises saponifying with an alkali a distillation residue of tall oil containing 20 to 50% of fatty acids, 20 to 50% of rosin acids and 10 to 30% of unsaponifiable matter, making up the resultant mixture of rosin acid soaps, fatty acid soaps and unsaponifiable matter as a solution of about 5 to 35% saponified distillation residue in water and isopropyl alcohol, the final solution containing 15 to 36% of isopropyl alcohol, counter-currently extracting the solution with naphtha to remove unsaponifiable matter, removing the naphtha and isopropyl alcohol from the residual soap solution, acidifying the soaps and removing the rosin and fatty acids from the residue.

6. A method of obtaining the rosin and fatty acids of tall oil in relatively pure state from a distillation residue of tall oil, which method comprises saponifying with an alkali a distillation residue of tall oil containing 20 to 50% of fatty acids, 20 to 50% rosin acids and 10 to 30% of unsaponifiable matter, making up the resultant mixture of rosin acid soaps, fatty acid soaps and unsaponifiable matter as a solution of about 5 to 35% saponified distillation residue in water and isopropyl alcohol, the final solution containing 15 to 36% of isopropyl alcohol, counter-currently extracting the solution with naphtha to remove unsaponifiable matter, removing the naphtha and isopropyl alcohol from the residual soap solution, acidifying the soaps, and removing the rosin and fatty acids from the residue by distillation.

7. In a method of obtaining the unsaponifiable matter of tall oil, the steps which comprise saponifying with sodium hydroxide a distillation residue of tall oil comprising 20 to 50% fatty acids, 20 to 50% rosin acids, and 10 to 30% unsaponifiable matter, dissolving the resultant saponified mixture in water and a lower water soluble aliphatic monohydric alcohol to provide a solution of a final concentration of 7 to 50% of the alcohol, extracting the unsaponifiable matter from the mixture by intimately contacting it with naphtha, at a temperature at which a sample of the solution when shaken with naphtha will separate cleanly in a layer in less than 6 minutes, contact being effected by introducing naphtha continuously at one end of an extraction zone and solution at the other, causing the two to flow through each other by differences in density, withdrawing the naphtha solution of unsaponifiable matter at the end of the extraction zone opposite that of introduction, and recovering the unsaponifiable matter.

8. A process as defined in claim 7 in which the temerature of the system is about 160° F.

9. A process as defined in claim 7 in which the temperature is within a range of 120 to 200° F.

ROGER M. CHRISTENSON.
STEWART W. GLOYER.

REFERENCES CITED

The following references are of record in the file of this patent:

UNITED STATES PATENTS

| Number | Name | Date |
|---|---|---|
| 2,143,345 | Frankel | Jan. 10, 1939 |
| 2,218,971 | Julian et al. | Oct. 22, 1940 |
| 2,248,346 | Gayer et al. | July 8, 1941 |
| 2,273,045 | Julian et al. | Feb. 17, 1942 |
| 2,275,075 | Gayer et al. | Mar. 3, 1942 |
| 2,280,815 | Fernholz | Apr. 28, 1942 |

FOREIGN PATENTS

| Number | Country | Date |
|---|---|---|
| 547,324 | Great Britain | Jan. 20, 1942 |

OTHER REFERENCES

Book of Standards, A. S. T. M., 1044, Part III, page 2097.